US007389416B2

(12) United States Patent
Cachin et al.

(10) Patent No.: US 7,389,416 B2
(45) Date of Patent: Jun. 17, 2008

(54) METHOD OF VERIFIABLY SHARING A SECRET IN POTENTIALLY ASYNCHRONOUS NETWORKS

(75) Inventors: Christian Cachin, Thalwil (CH); Klaus Kursawe, Rueschlikon (CH); Anna Lysyanskaya, Providence, RI (US); Reto Strobl, Bad Ragaz (CH)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 10/471,667

(22) PCT Filed: Feb. 15, 2002

(86) PCT No.: PCT/IB02/00468

§ 371 (c)(1),
(2), (4) Date: Mar. 2, 2004

(87) PCT Pub. No.: WO02/087145

PCT Pub. Date: Oct. 31, 2002

(65) Prior Publication Data

US 2004/0139146 A1    Jul. 15, 2004

(30) Foreign Application Priority Data

Mar. 16, 2001 (EP) .................................. 01106633

(51) Int. Cl.
*H04L 29/00* (2006.01)
(52) U.S. Cl. ........................ 713/163; 713/180; 713/176; 713/150; 380/28; 380/30; 708/100; 708/200; 708/490; 709/200
(58) Field of Classification Search ................ 713/163, 713/176, 180, 150; 380/28, 30; 708/100, 708/200, 490; 709/200
See application file for complete search history.

(56) References Cited

U.S. PATENT DOCUMENTS

| 5,598,529 | A  | * | 1/1997  | Garay et al. .................. 714/11 |
| 6,754,845 | B2 | * | 6/2004  | Kursawe et al. ............... 714/4 |
| 2002/0129087 | A1 | * | 9/2002  | Cachin et al. ............... 709/200 |
| 2004/0156507 | A1 | * | 8/2004  | Dellow et al. ............... 380/277 |
| 2004/0254967 | A1 | * | 12/2004 | Cachin ....................... 708/250 |

FOREIGN PATENT DOCUMENTS

| JP | 08046607   | 2/1996 |
| JP | 2000214774 | 8/2000 |

OTHER PUBLICATIONS

Krawczyk et al., "Proactive secret sharing or: How to cope with perpetual leakage", IBM T.J. Watson Research Center, Nov. 1, 1995, pp. 1-22.*
Rabin et al., "Fast Asynchronous Byzantine Agreement with Optimal Resilience", ACM STOC 1993, pp. 42-51.*
Cachin et al., "Random Oracles in Constantinople: Practical Byzantine Agreement using Cryptography", PODC ACM Jul. 2000, pp. 123-132.*
Rabin et al., "Distributed Pseudo-Random Bit Generators—A New Way ti Speed-Up Shared Coin Tossing", ACM Symposium on the Principle of Distributed computing, 1996, pp. 1-16.*
Feldman et al., "Optimal Algorithms for Byzantine Agreement", ACM, 1988, pp. 148-161.*
Krings et al, "A Byzantine Resilient approach to Network Security", 1999.*
Zamsky, "A Randomized Byzantine Agreement Protocol with Constant Expected Time and Guaranteed Termination in Optimal (Deterministic) Time", PODC, '96, Philadelphia, 1996, pp. 201-208.*
Cachin et al., "Secure and Efficient Asynchronous Broadcast Protocols", IBM Research, Zurich Research Laboratory, Mar. 7, 2001, pp. 1-49.*

* cited by examiner

*Primary Examiner*—Kambiz Zand
*Assistant Examiner*—Tongoc Tran
(74) *Attorney, Agent, or Firm*—Robert M. Trepp

(57) ABSTRACT

In accordance with the present invention, there is provided a method for sharing a secret value x among n participating network devices via an asynchronous network. The n participating network devices comprises t faulty devices and k sub-devices capable of reconstructing the secret value x, wherein t<n/3 and k<n. The secret value x being provided by a distributor. The method comprising of deriving by the distributor share values $s_i$ and subshare values $s_{ij}$ of the secret value x by applying a linear secret sharing scheme and deriving verification values $g^{s_{ij}}$ usable for verification of validity of the share values $s_i$ and the subshare values $s_{ij}$; sending to each participating network device a share message comprising the corresponding subshare values $s_{Ai}, s_{iA}, s_{Bi}, s_{iB}, s_{Ci}, s_{iC}$; broadcasting a verification message comprising the verification values $g^{s_{ij}}$; receiving by at least l participating network devices the verification message comprising the verification values $g^{s_{ij}}$, wherein $n-t \geq l \geq 2t+1$, and performing the following steps 1) to 4) for each recipient network device, 1) if a share message comprising subshare values $s_{ij}$ is received, determining the validity of the subshare values $s_{ij}$ in dependence on the verification values $g^{s_{ij}}$ and 2) broadcasting in the event of positive determination an agree message comprising an agree-value Y; 3) receiving l agree messages comprising the agree-values $Y_A, Y_B, Y_c$; 4) in the event of l received agree messages, obtaining the share value $s_i$ either from the share message sent by the distributor D or from subshare values $s_{ij}$ received from participating network devices and determining the validity of the subshare values $s_{ij}$ in dependence on the verification values $g^{s_{ij}}$. In a second aspect of the present invention a method without broadcast is disclosed.

17 Claims, 4 Drawing Sheets

US 7,389,416 B2

METHOD OF VERIFIABLY SHARING A SECRET IN POTENTIALLY ASYNCHRONOUS NETWORKS

CROSS REFERENCE AND PRIORITY

This application filed under 35 USC 371, is cross-referenced with and claims priority from International Patent Application PCT/IB02/00468 filed on 15 Feb. 2002, and published in English with Publication No. WO02/087145 on 31 Oct. 2002, under PCT article 21(2), which in turn claims priority of EP 01106633.9, filed on 16 Mar. 2001.

TECHNICAL FIELD

The present invention relates to a network whose processor nodes exchange information in an asynchronous fashion, and more particularly a method for sharing a secret value among the nodes in a way that a sufficiently large subset of the nodes can reconstruct the secret value, while a smaller set can not compromise it, even in the presence of undetected malicious nodes.

BACKGROUND OF THE INVENTION

Secret sharing schemes protect the secrecy and integrity of information by distributing the information over n different locations. The information can only be recovered if one has access to a certain minimal number of locations. In particular, in a (k, n)-threshold scheme, k locations together can reconstruct the secret information, where k−1 locations cannot get any information about it.

In H. Krawczyk et al. "Proactive secret sharing or: How to cope with perpetual leakage" In Crypto '95, pages 339-352, Santa Barbara, 1995, a synchronous proactive secret sharing scheme is presented. Therein, the lifetime of the system is divided into short time periods only, such that it is plausible to assume that an adversary cannot break into more than k−1 locations during one time period. Further, the adversary is assumed to be transient, i.e. corrupted servers can be identified and rebooted, such that the adversary looses control over them, but still remembers the last state of the server. At the beginning of each time period, the system is refreshed such that the information, an adversary gathered in a previous period becomes obsolete. Refreshing the system involves the generation of new random shares of the old secret.

An asynchronous verifiable secret sharing system has been proposed by Ran Canetti and Tal Rabin, "Fast asynchronous Byzantine agreement with optimal resilience" in STOC 93, pages 42-51, New York, 1993, basing on ideas from Feldman and Micali, "An Optimal Probabilistic Protocol for Synchronous Byzantine Agreement", STOC 88, pages 148-161, New York 1988. This scheme does not use public key cryptography, but has a very high message complexity.

It is an object of the present invention to create a verifiable secret sharing scheme for a potentially asynchronous network capable of tolerating a maximum of t faulty devices, processors or parties. Partially asynchronous network in that sense means that the network can work either in synchronous or asynchronous mode, depending on the circumstances and the given assumptions.

It is a further object of this invention to provide a method to be operable among n processors or parties, where at most t<n/3 processors are faulty, and further where the sharing can be achieved in constant time with the number of messages being exchanged in the order of the square of n.

Glossary

The following are informal definitions to aid in the understanding of the description.

In Asynchronous Verifiable Secret Sharing (AVSS), a secret value x is shared by a dealer or distributor among n parties $P_1, \ldots, P_n$ such that each coalition of k−1 parties can not compromise x, while any coalition of k or more parties can efficiently construct x. This is also called (k, n) sharing, indicating that k out of n parties are required to reconstruct the secret value x.

Group: A group in the cryptographic sense is an algebraic system (G,*) consisting of a set of elements or numbers and a group operation (*) with some specified properties, where (*) is associative, has a neutral element, and where every element in G has an inverse element.

The choice of the symbol (*) is arbitrary. In fact, the operation of most groups is denoted by either + or ·, and such groups are referred to as additive or multiplicative group, respectively.

For example, for any positive integer q, a set $Z_q$ consists of the integers $0, \ldots, q-1$, and it forms a group under the operation of addition modulo q. Moreover, the subset of $Z_q$ consisting of those integers relatively prime to a forms a group under multiplication modulo q, and is denoted $Z_q^*$. In particular, if p is prime, then $Z_q^*$ consists of $\{1, \ldots, p-1\}$, and is a group with p−1 elements.

Hash function: A hash function is a computationally efficient function mapping binary strings of arbitrary length to binary strings of some fixed length.

Hybrid Failures

The method for achieving Byzantine Agreement can distinguish between several different ways in which a network device can fail. This could for example be Byzantine Failures BF: If a byzantine failure BF occurs, the adversary has taken full control over the corresponding machine. All secrets this machine has are handed over to the adversary, who now controls its entire behavior.

Crash Failures CF: A crash failure CF simply means that the corresponding machine stops working. This could happen anytime, i.e., even in the middle of a broadcast or while sending a message. It is assumed that there is no mechanism other parties can reliably detect such a crash.

Link Failures LF: A link failure LF occurs when not a party, but an interconnecting link becomes faulty. As the link has no access to authentication keys, it is easy to prevent it from modifying or inserting messages. A faulty link could however delete messages, and it might completely disconnect two parties.

Adversary Structure

An adversary structure T is a set of sets (coalitions) of parties whose corruption the system should tolerate. This generalizes a threshold scheme to be more flexible and adapt to environmental structures.

SUMMARY AND ADVANTAGES OF THE INVENTION

In accordance with the present invention, there is provided a machine-implementable method for sharing a secret value x among n participating network devices via an asynchronous network with private links, i.e., the communication between honest participants can not be read by an adversary. The n participating network devices comprises t faulty devices and k sub-devices capable of reconstructing the secret value x, wherein t<n/3 and k<n. The secret value x is provided by a distributor. The method comprising of deriving by the distributor share values $s_i$ and subshare values $s_{ij}$ of the secret value x by applying a linear secret sharing scheme and deriving verification values $g^{s_{ij}}$ usable for verification of validity of the share values $s_i$ and the subshare values $s_{ij}$; sending to each participating network device a share message comprising the corresponding subshare values $s_{Ai}, s_{iA}, s_{Bi}, s_{iB}, s_{Ci}, s_{iC}$; broadcasting a verification message comprising the verification values $g^{s_{ij}}$; receiving by at least l participating network devices the verification message comprising the verification values $g^{s_{ij}}$, wherein $n-t \leq l \leq 2t+1$, and performing the following steps 1) to 4) for each recipient network device, 1) if a share message comprising subshare values $s_{ij}$ is received, determining the validity of the subshare values $s_{ij}$ in dependence on the verification values $g^{s_{ij}}$ and 2) broadcasting in the event of positive determination an agree message comprising an agree-value Y; 3) receiving l agree messages comprising the agree-values $Y_A, Y_B, Y_C$; 4) in the event of l received agree messages, obtaining the share value $s_i$ either from the share message sent by the distributor D or from subshare values $s_{ij}$ received from participating network devices and determining the validity of the subshare values $s_{ij}$ in dependence on the verification values $g^{s_{ij}}$.

In a second aspect of the present invention, there is provided a machine-implementable method for sharing a secret value x among n participating network devices A, B, C via an asynchronous network, the n participating network devices A, B, C comprising t faulty devices and k sub-devices capable of reconstructing the secret value x, wherein $t<n/3$ and $k \leq n-t$, the secret value x being provided by a distributor D. This method performs without broadcast.

The method turns out to be efficient and also theoretically nearly optimal in the sense that it withstands the maximum number of corrupted parties. Moreover, it is applicable in asynchronous environments and tolerates byzantine failures.

If some secret value x is already shared, the method can be used to share a secret value y being 0. It can be verified using the verification values that the value of y really is 0.

By adding share values $y_i$ of 0 to the share values $x_i$ of x, the new share values $y_i + x_i$ share the secret x+0, i.e., x.

By doing so, new share values of the same secret value are generated, which can be used to render old shares that may have leaked to the adversary useless.

It is advantageously possible to modify the method in a way that every participating network device with index i can derive all its subshare values $s_{i1}$, to $s_{in}$ and $s_{1i}$ to $s_{ni}$. This way, it is easy to efficiently incorporate an additional network device into a group of participating network devices that share the secret value x, by reconstructing the corresponding subshare values $s_{(n+1)i}$ from the known subshare values $s_{1i}$ to $s_{ni}$.

The subshare values $s_{ij}$ and additional verification values can be sent to each participating network device and upon receiving sufficient additional verification values the verification values $g^{s_{ij}}$ can be modified in dependence of the received additional verification values. This has the advantage that the broadcast primitive used to broadcast the verification message can be simplified and this causes less network communication.

If the step of obtaining the share value $s_i$ from subshare values $s_{ij}$ received by participating network devices further comprises broadcasting a complain message and receiving the subshare values $s_{ij}$ sent in response to the complain message, then the advantage occurs that the network traffic can be reduced in the case the distributor is honest, which usually holds.

The verification values $g^{s_{ij}}$ can be derived by choosing a common number g from a cryptographic group G corresponding to the linear secret sharing scheme and deriving the verification values $g^{s_{ij}}$ by raising the chosen common number g to the power of a linear function f of the share value $s_i$. By doing so, a simple cryptographic primitive can be used for the generation of the verification values $g^{s_{ij}}$.

The verification values $g^{s_{ij}}$ can be derived using a hash function. This leads to smaller verification values $g^{s_{ij}}$. Hence less data has to be transferred via the network.

Several secret values can be shared simultaneously. This is more efficient due to synergy effects.

The number t of faulty devices can be seen as a set T of sets comprising different participating network devises, i.e. devices running different operating systems and within different locations. Moreover, the participating network devices can show hybrid failures, e.g. byzantine failures, crash failures, and link failures, reflecting a different structure of the set T or different thresholds $t_i$, with i=1, 2, . . . . This shows the flexibility of the protocol.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DETAILED DESCRIPTION OF THE INVENTION

Figure 1:
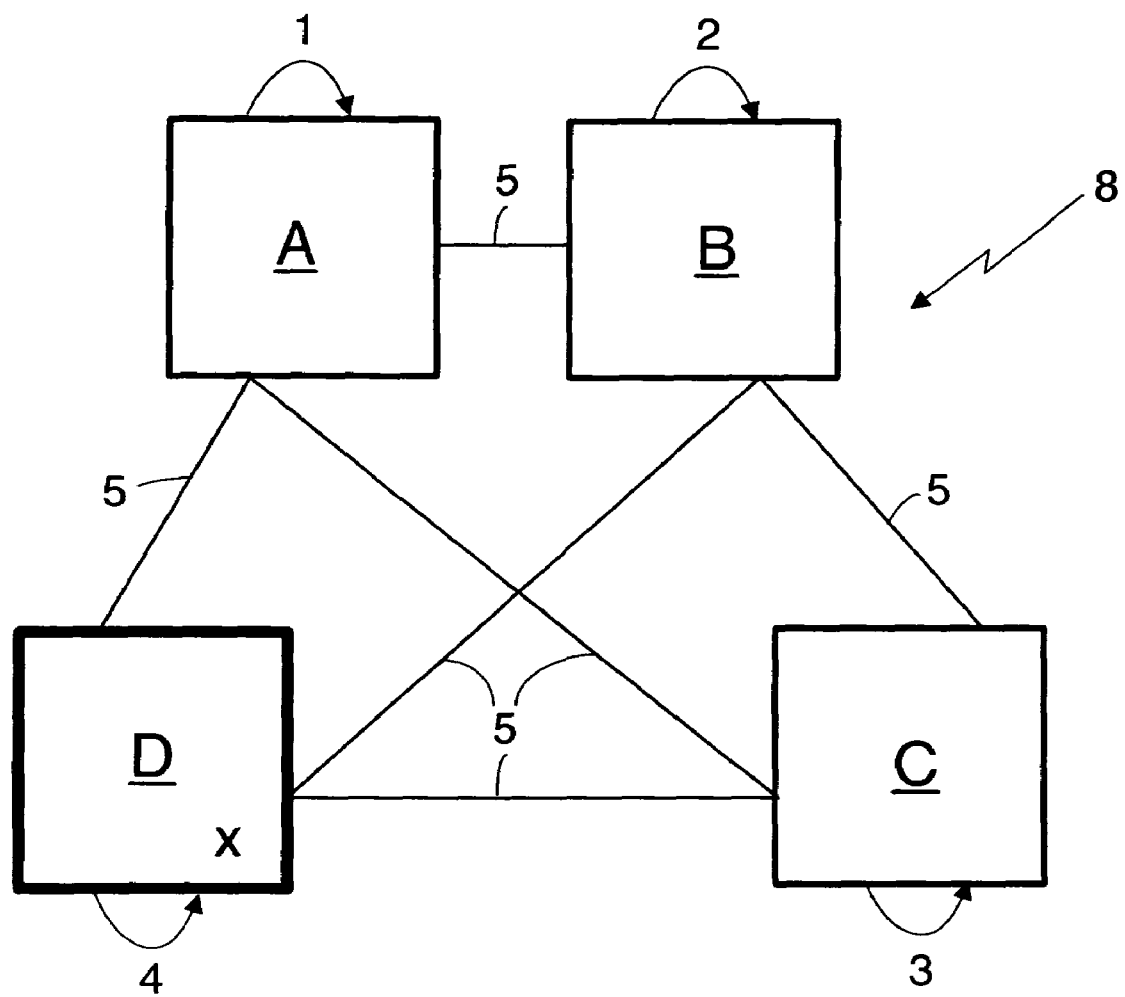
FIG. 1 shows a typical asynchronous network with multiple participating network devices and a distributor.

FIG. 1 shows an example of a common computer system 8, where a secret value x is shared. It consists of n=4 participating network devices A, B, C, and D which are connected via communication lines (1 through 5) to a network. The system comprises a distributor D, which is designated by the "X". Each participating network device A, B, C, D may be any type of computer device known in the art from a computer on a chip or a wearable computer to a large computer system. The communication lines can be any communication means commonly known to transmit data or messages from one participating network device A, B, C, D to another. For instance, the communication lines may be either single, bi-directional communication lines 5 between each pair of participating network devices A, B, C, D or one unidirectional line in each direction between each pair of participating network devices A, B, C, D. Such a computer system 8 and communication lines 5 are well known in the art. In the case where one participating network device A, B, C sends information to itself, an equivalent result could be achieved by merely moving data within the participating network device and not sending it over a communication line to itself. The common computer system 8 is shown to facilitate the description of the following asynchronous verifiable secret sharing protocol. The same reference numbers are used to denote the same or like parts.

Figure 2:
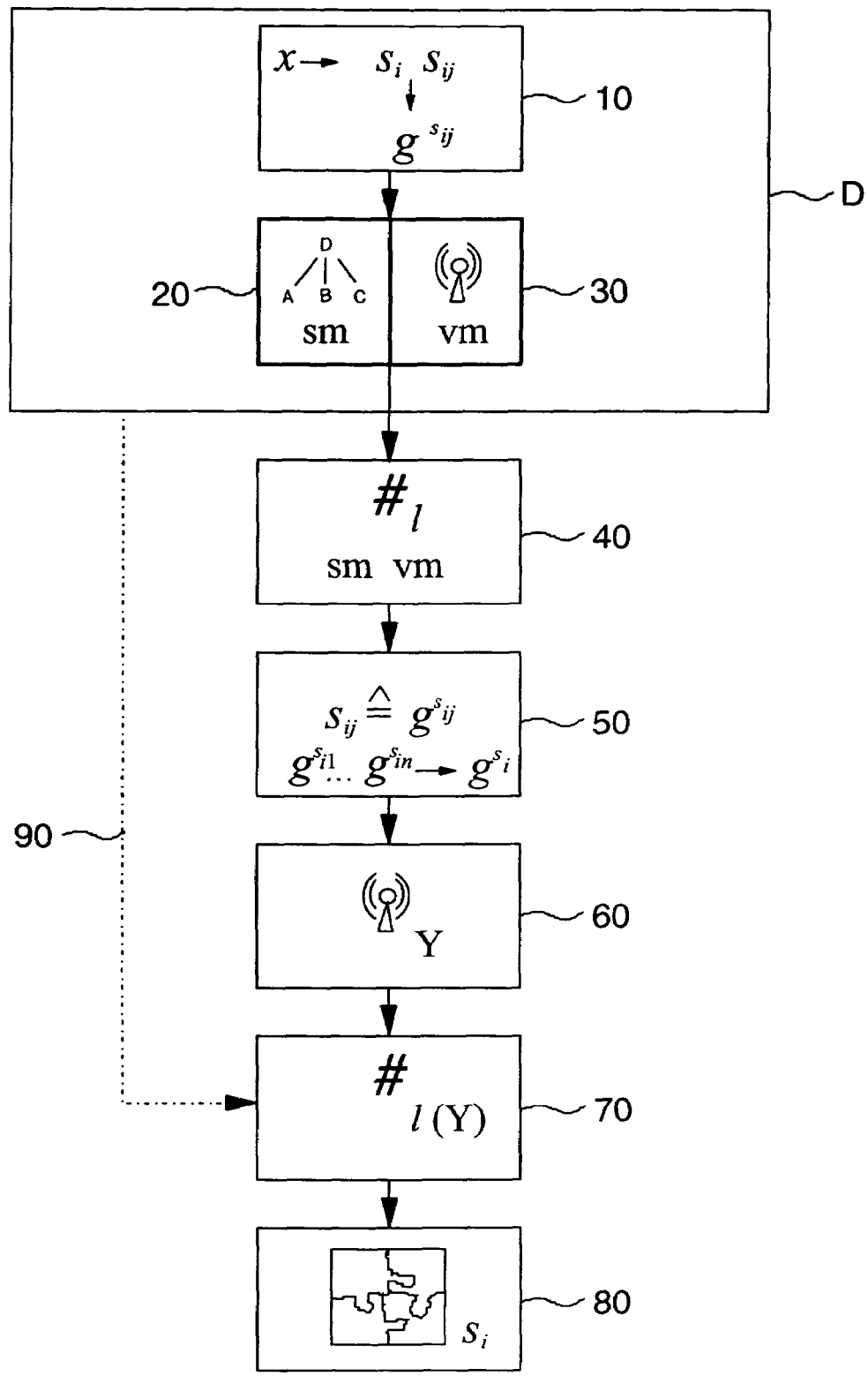
FIG. 2 shows a schematic diagram of the asynchronous verifiable secret sharing scheme.

FIG. 2 shows the general flow of the protocol for sharing a secret value x among n participating network devices A, B, C via the asynchronous network, whereby a series of messages being sent and received by each participating network device A, B, C, D.

It is supposed that the distributor D wants to share the secret value x. At first, as indicated with box 10, the distributor D derives share values $s_i$ of the secret value x according to a normal linear secret sharing scheme, for example as described in A. Shamir, "How to share a secret", Communications of the ACM 22 (1979), 612-613. In addition to this, the distributor D also derives so-called subshares, also referred to as subshare values $s_{ij}$. This means, for each share value $s_i$ the distributor D creates respective subshare values $s_{ij}$. The subshare values $s_{ij}$ can be achieved by another linear secret sharing scheme which is independent of the creation of the share values $s_i$. Alternatively, the secret value x can be shared using Shamir's scheme with a polynom over two variables. Furthermore, the distributor D derives verification values $g^{s_{ij}}$ here by simple power operations in a cryptographic group G. This verification values $g^{s_{ij}}$ are interpreted as a verification table. The verification values $g^{s_{ij}}$ are usable for verification of validity of the share values $s_i$ and the subshare values $s_{ij}$.

TABLE 1

| X: = $S_{00}$ | $S_1$: = $S_{10}$ | $S_2$: = $S_{20}$ | ... | $S_n$: = $S_{30}$ |
|---|---|---|---|---|
| $S_{01}$ | $S_{11}$ | $S_{21}$ | ... | $S_{n1}$ |
| $S_{02}$ | $S_{12}$ | $S_{22}$ | ... | $S_{n2}$ |
| ... | ... | ... | ... | ... |
| $S_{0n}$ | $S_{1n}$ | $S_{2n}$ | ... | $S_{nn}$ |

Table 1 shows the corresponding subshare values $s_{ij}$ for each respective share value $s_i$. All subshare values $s_{ij}$ in a particular row share the leftmost value in that row, while all subshare values $s_{ij}$ in a particular column share the uppermost value, the share value $s_i$.

Note that the value $s_{10}$ denotes the value shared by the values $s_{11}, s_{12} \ldots , s_{1n}$, while $s_{01}$ denotes the value shared by the values $s_{11}, s_{21} \ldots , s_{n1}$.

It is an advantage that a crash or byzantine behavior of the distributor D in the middle of the protocol can be tolerated. If t+1 honest participating network devices A, B, C think they received valid share values $s_i$ of the secret value x, then all other honest participating network devices A, B, C can reconstruct their share values $s_i$ of the secret value x with the help of that t+1 participating network devices A, B, C, even if they never heard from the distributor D at all.

However, it is still possible for a dishonest distributor D to distribute corrupt share values $s_i$, i.e., share values $s_i$ that do not combine to a unique secret value x. To deal with this problem, the distributor D adds verification information that allows all participating network devices A, B, C to test the validity of the share values $s_i$ they received, without learning anything about the secret value x.

The distributor D sends to each participating network device A, B, C a share message sm comprising the corresponding subshare values $s_{Ai}, s_{iA}, s_{Bi}, s_{iB}, s_{Ci}, s_{iC}$, as indicated with box 20, and broadcasts a verification message vm comprising the verification values $g^{s_{ij}}$, as indicated with box 30. The broadcast can be a reliable broadcast, as described in Cachin et al., "Secure and Efficient Asynchronous Broadcast Protocols", Joe Kilian, editor, Advances in Cryptology: CRYPTO 2001, volume 2139 of Lecture Notes in Computer Science, pages 524-541, Springer, 2001. For the participating network device A, B, C with index i, the subshare values $s_{ij}$ which the distributor D sends to this participating network device A, B, C correspond to row and column i in Table 1. The steps indicated by boxes 10, 20, and 30 are performed by the distributor D as indicated by the box labeled with D.

The verification message vm comprises more information, being sufficient to verify all share values $s_i$ and subshare values $s_{ij}$ the recipient network device A, B, C will receive during the run of the protocol.

The verification message vm is received by the participating network devices A, B, C, as indicated with box 40. The following steps are performed by each recipient network device A, B, C.

If a share message sm comprising subshare values $s_{ij}$ was received in the previous step, then the validity of the subshare values $s_{ij}$ in dependence on the verification values $g^{s_{ij}}$ is determined, as indicated with box 50. In the event of positive determination an agree message comprising an agree-value Y is broadcast, as indicated with box 60. Then l agree messages, with n−t≦l≦2t+1, comprising the agree-values $Y_A, Y_B, Y_C$ will be received by the respective network device A, B, C, as indicated in box 70. The steps in box 70 and box 80 can also be executed by one participating network device A, B, C that did not perform the steps indicated by the boxes 40, 50, and 60, as it is indicated with the arrow labeled with 90.

In the event of l received agree messages, each participating network device A, B, C obtains the share value $s_i$ either from the share message sm sent by the distributor D or from the subshare values $s_{ij}$ received from the other participating network devices A, B, C. The validity of the subshare values $s_{ij}$ in dependence on the verification values $g^{s_{ij}}$ is then determined. This is indicated with box 80.

Use of Commitments

For each share value $s_i$ and subshare value $s_{ij}$ the distributor D computes a commitment function $C(s_i)$ or $C(s_{ij})$, respectively. The commitments have the property that if the share values $s_i$ and subshare values $s_{ij}$ combine to one secret value x and the share value $s_i$, then the $C(s_i)$ (or $C(s_{ij})$) combine to one secret $C(x)$ (or $C(s_i)$).

One example is to use exponentation in a finite group G of prime order, i.e., $C(s_i)=g^{s_i}$, as demonstrated in Cachin et al., "Random Oracles in Constantinople: Practical Byzantine Agreement using Cryptography", in PODC 00, Portland, Oreg., 2000.

It is possible though to use more advanced commitments, for example Pedersen commitments as described in T. Pedersen, "Non-interactive and information-theoretic secure verifiable secret sharing", CRYPTO '91, volume 576 of Lecture Notes in Computer Science, pages 129-140, Springer-Verlag, 1992.

The commitments are distributed to all participating network devices A, B, C using a consistent broadcast, as in Cachin et al., "Secure and Efficient Asynchronous Broadcast ProtocolS", Joe Kilian, editor, Advances in Cryptology: CRYPTO 2001, volume 2139 of Lecture Notes in Computer Science, pages 524-541, Springer, 2001, i.e., all participating network devices A, B, C receive the same commitments; this broadcast can be simplified adding a new step to the protocol, as demonstrated when describing optimizing the communication complexity below.

The protocol then goes as follows:

1. The distributor D distributes all share values $s_i$ and subshare values $s_{ij}$ to the participating network device A, B, C with the index i and broadcasts the verification table within a respective message.
2. Each participating network device A, B, C that receives above messages from the distributor D tests if
   their share values $s_i$ and subshare values $s_{ji}$ correspond to $C(s_i)$ and $C(s_{ji})$ in the verification table;

$C(s_{ij})$ in the verification table combine to one unique $C(s_i)$; $C(s_{ji})$ in the verification table combine to some unique value.

3. If one participating network device A, B, C with index i receives all share values $s_i$ and subshare values $s_{ji}$, and all tests are ok, it broadcasts an "OK-Message".

4. When receiving sufficiently many, i.e., at least 2t+1, OK-Messages, the respective participating network device A, B, C with index i accepts the distributor D and its share value $s_i$.

5. If one participating network device A, B, C with index i did not receive a valid share $s_i$ yet, then it sends a complain message to all participating network devices A, B, C. On receiving such a complain message, the receiving participating network device A, B, C with index j sends its subshare value $s_{ij}$ to the complaining participating network device A, B, C with index i. This participating network device A, B, C then verifies the subshare value $s_{ij}$ using the verification table, and combines the valid shares to $s_i$.

Optimizing the Communication Complexity

The verification message vm comprising the verification table broadcast by the distributor D is relatively large, and can be optimized in several ways. Below, it is described how the protocol can be modified to use a cheaper broadcast primitive, as well as smaller verification values:

Each participating network device A, B, C with index i receives only its row i and column i of Table 1, i.e., for all j, $s_{ij}$ and $s_{ji}$, and the corresponding verification values $C(s_{ij})$ and $C(s_{ij})$. Furthermore, each participating network device A, B, C receives a hash value on each row and each column as well as $C(s_{j0})$ and $C(s_{0j})$, where $s_{j0}$ is the value shared by $s_{j1}, \ldots, s_{jn}$. These values might not be broadcast consistently, i.e., every participating network device A, B, C might get different values if the distributor D is dishonest.

On receiving the share message sm and verification message vm, each participating network device A, B, C verifies the hash values and verification values it has received, and re-computes the verification values $C(s_{j0})$, $C(s_{0j})$, $C(s_{ij})$ and $C(s_{ij})$ if necessary, i.e., if they do not correspond to the share values $s_{j0}$ and $s_{0j}$ and the subshare values $s_{ij}$ and $s_{ji}$.

The respective participating network device A, B, C sends the subshare values $s_{ij}$ and $s_{ji}$ to the participating network device A, B, C with index j, along with all hash values and the—possibly re-computed—verification values.

The respective participating network device A, B, C waits until receiving sufficiently, i.e., at least 2t+1, of the above messages that agree on the hash values and comprise valid subshare values $s_{ij}$ and $s_{ji}$ corresponding to said hash value. Then it sends an OK-Message to each participating network devices A, B, C.

On receiving sufficiently many, i.e., at least 2t+1 OK-Messages, each participating network device A, B, C accepts the distributor D. If necessary, the share value $s_i$ is computed form the subshare values $s_{ij}$.

Note that the above method for optimizing the communication complexity is not intended to ensure agreement on whether or not the distributor D is accepted; it is possible that some participating network device A, B, C does not terminate the protocol, while others do. It is straightforward however to add a Byzantine agreement protocol to the end of the present protocol and ensure that if one participating network device A, B, C accepts the distributor D and its share value $s_i$, all honest participating network devices A, B, C with index j accept the distributor D and receive their share value $s_j$.

Without Broadcast

It is possible to perform the protocol without broadcast and to integrate the protocol for verifiable secret sharing with a reliable broadcast. This has the advantage of further reducing the communication load and the computation load because no consistent broadcast is used. Consistent broadcast involves complex digital signature computations which are avoided.

Figure 3:
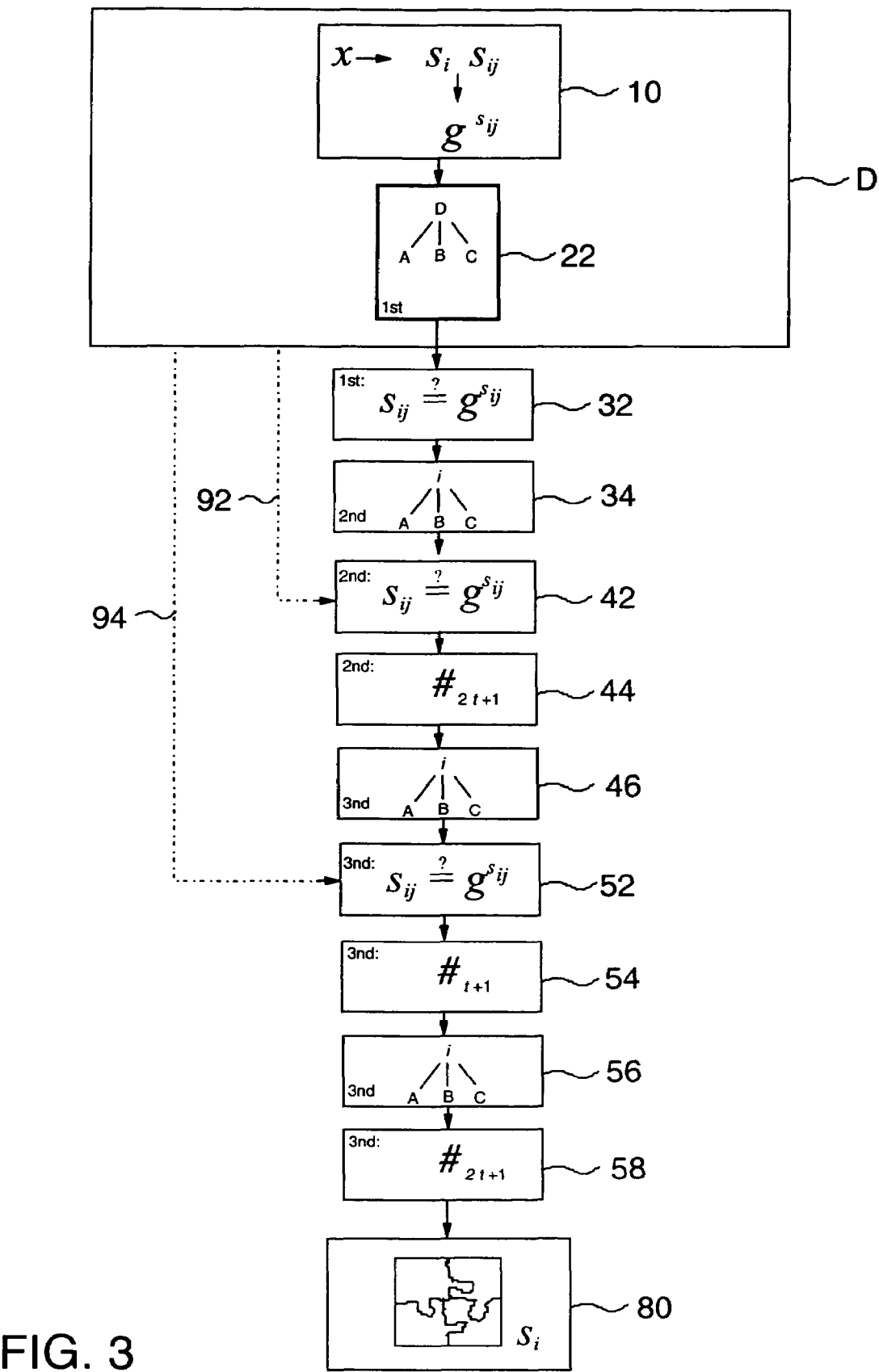
FIG. 3 shows a schematic diagram of the asynchronous verifiable secret sharing scheme without broadcast.

FIG. 3. shows a schematic diagram of such an asynchronous verifiable secret sharing scheme without broadcast. The same parts signs or reference numerals are used to denote the same or like parts.

The protocol uses here three rounds of message exchanges:

As indicated with box 10, the distributor D derives share values $s_i$ and subshare values $s_{ij}$ of the secret value x by applying a linear secret sharing scheme. Moreover, the distributor D derives verification values $g^{s_{ij}}$ which are usable for verification of validity of the share values $s_i$ and the subshare values $s_{ij}$. In the next step, box 22, a first message (1st) comprising the corresponding subshare values $s_{Ai}, s_{iA}, s_{Bi}, s_{iB}, s_{Ci}, s_{iC}$ and the verification values $g^{s_{ij}}$ are sent to each participating network device A, B, C.

For at least 2t+1 participating network devices A, B, C the following steps i.) to vii.) for each participating network device A, B, C, with index i are performed.

i.) Each participating network device A, B, C with index i that receives the first message (1st:) from the distributor D determines the validity of all the subshare values $s_{ij}, s_{ji}$, for i=1, . . . , n and j=1, . . . , n, in dependence on the verification values $g^{s_{ij}}$, $g^{s_{ji}}$ as indicated with box 32.

ii.) In the event of positive determination, the participating network device with index i derives from the received subshare values $s_{ij}, s_{ji}$ relevant subshare values $s_{im}, s_{mi}$ which being in common with the other participating network devices A, B, C, with index m. Then, the participating network device with index i sends a second message (2nd) comprising the verification values $g^{s_{rj}}$, for r=1, . . . , n and j=1, . . . , n, and the relevant subshare values $s_{im}, s_{mi}$ to each participating network device A, B, C, with index m, as indicated with box 34.

iii.) If the second message (2nd:) is received from one participating network device A, B, C, with index j the validity of the received subshare values $s_{ij}, s_{ji}$ is determined in dependence on the verification values $g^{s_{ij}}$, $g^{s_{ji}}$ by participating network devices A, B, C with index i, as indicated with box 42.

iv.) In the event of positive determination for 2t+1 received second messages (2nd:), as indicated with box 44, a third message (3rd) comprising the verification values $g^{s_{rj}}$ and the relevant subshare values $s_{im}, s_{mi}$ is sent to each participating network device A, B, C, with index m, as indicated with box 46. In the event that no first message (1st:) has been received, the relevant subshare values $s_{im}, s_{mi}$ are derived from the received second messages (2nd:), as it is indicated with the arrow labeled with 92.

v.) If the third message (3rd:) is received from one participating network device A, B, C, with index j the validity of the received subshare values $s_{ij}, s_{ji}$ is determined in dependence on the verification values $g^{s_{ij}}$, $g^{s_{ji}}$, as indicated with box 52.

vi.) In the event of positive determination for t+1 received third messages (3rd:) and not having sent the third message (3rd), as indicated with box 54, one third message (3rd) comprising the verification values $g^{s_{rj}}$ and the relevant subshare values $s_{im}, s_{mi}$ is sent to each participating network device A, B, C, with index m, as indicated with box 56. In the event that no first message (1st:) has been received the relevant subshare values $s_{im}, s_{mi}$ are derived from the received second or third messages (2nd:, 3rd:), as it is indicated with the arrow labeled with 94 for the received third messages (3rd:).

vii.) In the event of positive determination for 2t+1 received third messages, as indicated with box 58, the share value $s_i$ is derived from the received first, second, or third messages (1st:, 2nd:, 3rd:), as indicated with box 80. That means the share value $s_i$ form the distributor D is accepted.

The more efficient protocol can be combined with the method to use commitments and with the method to optimize the communication complexity. The protocol that results from this has the advantage of further reduced communication and computation complexity. It is an advantage that it also ensures an agreement on whether the distributor D is accepted or not, so that each participating network device A, B, C terminates if and only if every other participating network device A, B, C does so.

Hybrid Adversary Structures

Instead of a fixed threshold of t out of n corruptions, it is possible to gain more flexibility by reflecting real-world structures.

For example, an adversary could be able to control all participating network devices with a certain operating system, or he might bribe one system administrator to get access to all participating network devices at a specific site. Adversary structures cope with such an attack scheme.

To define an adversary structure T, one has to define every coalition of parties whose corruption the system should tolerate, e.g., a coalition of all participating network devices with the same operating system. The set of all those sets then is the adversary structure T.

Figure 4:
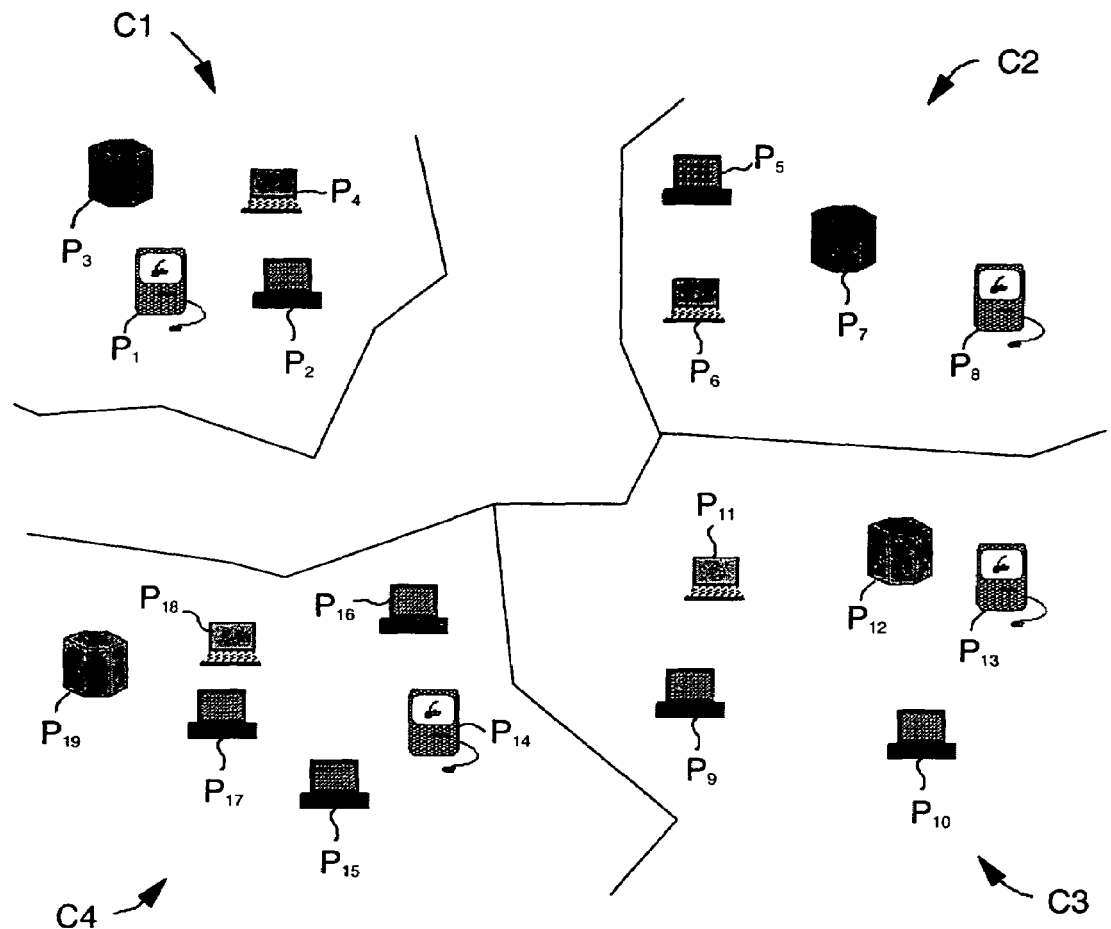
FIG. 4 shows a scenario of participating network devices distributed in a structured way.
Figure 4:
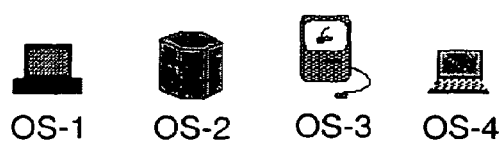

FIG. 4 illustrates a scenario of 19 sites of participating network devices $P_1$ to $P_{19}$ distributed in a structured way, i.e. each participating network device $P_1$ to $P_{19}$ has an operating system OS-1 to OS-4 and a location within a county C1 to C4. By conventional t–out of n structures, any set of six (Byzantine) failing participating network devices can be tolerated. Using the corresponding adversary structures, one can tolerate simultaneous failures of one operating system and one location. In the present example, this can be up to 10 participating network devices (e.g., failure of all participating network devices in the fourth country C4 or with the first operating system OS-1), or less than four if the corruptions are well distributed, i.e., four participating network devices covering all countries and all operating systems.

In the protocol for sharing a secret x, several types of failures can occur simultaneously. For example, it could differ between crash failures CF, byzantine failures BF, and link failures LF. This allows for a higher number overall number of failures to be tolerated.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. Method for sharing a secret value (x) among n participating network devices (A, B, C) via an asynchronous network, the n participating network devices (A, B, C) comprising t faulty devices and k sub-devices capable of reconstructing the secret value (x), wherein t<n/3 and k<n, the secret value (x) being provided by a distributor (D), comprising of the following steps:

deriving by the distributor (D) share values ($s_i$) and subshare values ($s_{ij}$) of the secret value (x) by applying a linear secret sharing scheme and deriving verification values ($g^{s_{ij}}$) usable for verification of validity of the share values ($s_i$) and the subshare values ($s_{ij}$);

sending to each participating network device (A, B, C) a share message comprising the corresponding subshare values ($s_{Ai}, s_{iA}, s_{Bi}, s_{iB}, s_{Ci}, s_{iC}$);

broadcasting a verification message comprising the verification values ($g^{s_{ij}}$);

receiving by at least l participating network devices (A, B, C) the verification message comprising the verification values ($g^{s_{ij}}$), wherein n−t≧l≧2t+1, and performing the steps 1) to 4) for each recipient network device (A, B, C), 1) if the share message comprising subshare values ($s_{ij}$) is received, determining the validity of the subshare values ($s_{ij}$) in dependence on the verification values ($g^{s_{ij}}$) and 2) broadcasting in the event of positive determination an agree message comprising an agree-value (Y);

3) receiving l agree messages comprising the agree-values ($Y_A, Y_B, Y_C$);

4) in the event of l received agree messages, obtaining the share value ($s_i$) either from the share message sent by the distributor (D) or from subshare values ($s_{ij}$) received from participating network devices (A, B, C), and determining the validity of the subshare values ($s_{ij}$) in dependence on the verification values ($g^{s_{ij}}$).

2. Method according to claim 1, wherein step 1) further comprises sending to each participating network device (A, B, C) its subshare values ($s_{ij}$) and additional verification values, and upon receiving l additional verification values modifying the verification values ($g^{s_{ij}}$) in dependence of the received additional verification values.

3. Method according to claim 1, wherein the step of obtaining the share value ($s_i$) from subshare values ($s_{ij}$) received from participating network devices (A, B, C) further comprises broadcasting a complain message and receiving the subshare values ($s_{ij}$) sent in response to the complain message.

4. Method according to claim 1, wherein the verification values ($g^{s_{ij}}$) are derived by choosing a common number (g) from a cryptographic group G corresponding to the linear secret sharing scheme, deriving the verification values ($g^{s_{ij}}$) by raising the chosen common number (g) to the power of a monotone function ƒ of the share value ($s_i$).

5. Method according to claim 1, wherein the verification values ($g^{s_{ij}}$) are derived using a hash function.

6. Method according to claim 1, wherein several secret values are shared simultaneously.

7. Method according to claim 1, wherein the number t of faulty devices is extended to a set T of sets comprising participating network devises (A, B, C; $P_1$-$P_{19}$).

8. Method according to claim 7, wherein the participating network devises (A, B, C; $P_1$-$P_{19}$) show hybrid failures (BF, CF, LF) reflecting a different structure of the set T or different thresholds $t_i$, with i=1, 2, ... m.

9. An article of manufacture comprising a computer usable medium having computer readable program code means embodied therein for causing sharing a secret value, the computer readable program code means is said article of manufacture comprising computer readable program code means for causing a computer to effect the steps of claim 1.

10. A program storage device readable by machine, tangibly embodying a program of instructions executable by the machine to perform method steps for sharing a secret value, said method steps comprising the steps of claim 1.

11. Method for sharing a secret value (x) among n participating network devices (A, B, C) via an asynchronous network, the n participating network devices (A, B, C) comprising t faulty devices and k sub-devices capable of reconstructing the secret value (x), wherein t<n/3 and k<n−t, the secret value (x) being provided by a distributor (D), comprising of the following steps:

derivng by the distributor (D) share values ($s_i$) and subshare values ($s_{ij}$) of the secret value (x) by applying a linear secret sharing scheme and deriving verification values ($g^{s_{ij}}$) usable for verification of validity of the share values ($s_i$) and the subshare values ($s_{ij}$);

sending to each participating network device (A, B, C) a first message comprising the corresponding subshare values ($s_{Ai}, s_{iA}, s_{Bi}, s_{iB}, s_{Ci}, s_{iC}$) and the verification values ($g^{s_{ij}}$);

for at least 2t+1 participating network devices (A, B, C) performing the following steps for each participating network device (A, B, C, with index i):

i.) if the first message comprising subshare values ($s_{ij}, s_{ji}$) is received, determining the validity of the subshare values ($s_{ij}, s_{ji}$) in dependence on the verification values ($g^{s_{ij}}, g^{s_{ji}}$);

ii.) in the event of positive determination, deriving from the received subshare values ($s_{ij}, s_{ji}$) relevant subshare values ($s_{im}, s_{mi}$) being in common with the other participating network devices (A, B, C, with index m), and sending a second message comprising the verification values ($g^{s_{ij}}$) and the relevant subshare values ($s_{im}, s_{mi}$) to each participating network device (A, B, C, with index m);

iii.) if the second message is received from one participating network device (A, B, C, with index j), determining the validity of the received subshare values ($s_{ij}, s_{ji}$) in dependence on the verification values ($g^{s_{ij}}, g^{s_{ji}}$);

iv.) in the event of positive determination for 2t+1 received second messages, sending a third message comprising the verification values ($g^{s_{ij}}$) and the relevant subshare values ($s_{im}, s_{mi}$) to each participating network device (A, B, C, with index m), in the event that no first message has been received, deriving the relevant subshare values ($s_{im}, s_{mi}$) from the received second messages;

v.) if the third message is received from one participating network device (A, B, C, with index j), determining the validity of the received subshare values ($s_{ij}, s_{ji}$) in dependence on the verification values ($g^{s_{ij}}, g^{s_{ji}}$);

vi.) in the event of positive determination for t+1 received third messages and not having sent a third message, sending one third message comprising the verification values ($g^{s_{ij}}$) and the relevant subshare values ($s_{im}, s_{mi}$) to each participating network device (A, B, C, with index m), in the event that no first message has been received, deriving the relevant subshare values ($s_{im}, s_{mi}$) from the received second or third messages;

vii.) in the event of positive determination for 2t+1 received third messages, deriving the share value ($s_i$) from the received first, second, or third messages.

12. An article of manufacture comprising a computer usable medium having computer readable program code means embodied therein for causing sharing a secret value, the computer readable program code means in said article of manufacture comprising computer readable program code means for causing a computer to effect the steps of claim 11.

13. A computer program product comprising a computer usable medium having computer readable program code means embodied therein for causing sharing a secret value (x), the computer readable program code means in said computer program product comprising computer readable program code means for causing a computer to effect the functions of claim 12.

14. A program storage device readable by machine, tangibly embodying a program of instructions executable by the machine to perform method steps for sharing a secret value, said method steps comprising the steps of claim 11.

15. A computer program product comprising a computer usable medium having computer readable program code means embodied therein for causing sharing a secret value (x), the computer readable program code means in said computer program product comprising computer readable program code means for causing a computer to effect the functions of claim 14.

16. An apparatus for sharing a secret value (x) among n participating network devices (A, B, C) via an asynchronous network, the n participating network devices (A, B, C) comprising :t faulty devices and k sub-devices capable of reconstructing the secret value (x), wherein t<n/3 and k<n, the secret value (x) being provided by a distributor (D), comprising means for deriving by the distributor (D) share values ($s_i$) and subshare values ($s_{ij}$) of the secret value (x) by applying a linear secret sharing scheme and deriving verification values ($g^{s_{ij}}$) usable for verification of validity of the share values ($s_i$) and the subshare values ($s_{ij}$);

means for sending to each participating network device (A, B, C) a share message comprising the corresponding subshare values ($s_{Ai}, s_{iA}, s_{Bi}, s_{iB}, s_{Ci}, s^{iC}$);

means for broadcasting a verification message comprising the verification values ($g^{s_{ij}}$);

means for receiving by at least l participating network devices (A, B, C) the verification message comprising the verification values ($g^{s_{ij}}$), wherein n−t≧l≧2t+1, and performing the steps 1) to 4) for each recipient network device (A, B, C), 1) if the share message comprising subshare values ($s_{ij}$) is received, determining the validity of the subshare values ($s_{ij}$) in dependence on the verification values ($g^{s_{ij}}$) and 2) broadcasting in the event of positive determination an agree message comprising an agree-value (Y);

3) receiving l agree messages comprising the agree-values ($Y_A, Y_B, Y_C$);

4) in the event of l received agree messages, obtaining the share value ($s_i$) either from the share message sent by the distributor (D) or from subshare values ($s_{ij}$) received from participating network devices (A, B, C), and determining the validity of the subshare values ($s_{ij}$) in dependence on the verification values ($g^{s_{ij}}$).

17. An apparatus for sharing a secret value (x) among n participating network devices (A, B, C) via an asynchronous network, the n participating network devices (A, B, C) comprising t faulty devices and k sub-devices capable of reconstructing the secret value (x), wherein t<n/3 and k≦n−t the secret value (x) being provided by a distributor (D), comprising:

means for deriving by the distributor (D) share values ($s_i$) and subshare values ($s_{ij}$) of the secret value (x) by applying a linear secret sharing scheme and deriving verification values ($g^{s_{ij}}$) usable for verification of validity of the share values ($s_i$) and the subshare values ($s_{ij}$);

means for sending to each participating network device (A, B, C) a first message comprising the corresponding subshare values ($s_{Ai}, s_{iA}, s_{Bi}, s_{iB}, s_{Ci}, s_{iC}$) and the verification values ($g^{s_{ij}}$);

for at least 2t+1 participating network devices (A, B, C) performing the following steps for each participating network device (A, B, C, with index i):

i.) if the first message comprising subshare values ($s_{ij}, s_{ji}$) is received, determining the validity of the subshare values ($s_{ij}, s_{ji}$) in dependence on the verification values ($g^{s_{ij}}, g^{s_{ji}}$);

ii.) in the event of positive determination, deriving from the received subshare values ($s_{ij}, s_{ji}$) relevant subshare values ($s_{im}, s_{mi}$) being in common with the other participating network devices (A, B, C, with index m), and sending a second message comprising the verification values ($g^{s_{ij}}$) and the relevant subshare values ($s_{im}, s_{mi}$) to each participating network device (A, B, C, with index m);

iii.) if the second message is received from one participating network device (A, B, C, with index j), determining the validity of the received subshare values ($s_{ij}, s_{ji}$) in dependence on the verification values ($g^{s_{ij}}, g^{s_{ji}}$);

iv.) in the event of positive determination for 2t+1 received second messages, sending a third message comprising the verification values ($g^{s_{ij}}$) and the relevant subshare values ($s_{im}, s_{mi}$) to each participating network device (A, B, C, with index in), in the event that no first message has been received, deriving the relevant subshare values ($s_{im}, s_{mi}$) from the received second messages;

v.) if the third message is received from one participating network device (A, B, C, with index j), determining the validity of the received subshare values ($s_{ij}, s_{ji}$) in dependence on the verification values ($g^{s_{ij}}, g^{s_{ji}}$);

vi.) in the event of positive determination for t+1 received third messages and not having sent a third message, sending one third message comprising the verification values ($g^{s_{ij}}$) and the relevant subshare values ($s_{im}, s_{mi}$) to each participating network device (A, B, C, with index m), in the event that no first message has been received, deriving the relevant subshare values ($s_{im}, s_{mi}$) from the received second or third messages;

vii.) in the event of positive determination for 2t+1 received third messages, deriving the share value ($s_i$) from the received first, second, or third messages.

* * * * *